United States Patent
Chung et al.

[11] Patent Number: 5,995,184
[45] Date of Patent: Nov. 30, 1999

[54] THIN FILM COMPENSATORS HAVING PLANAR ALIGNMENT OF POLYMERIZED LIQUID CRYSTALS AT THE AIR INTERFACE

[75] Inventors: Young J. Chung, Calabasas; Zhiming Zhuang, Thousand Oaks, both of Calif.; Zili Li, Barrington, Ill.; Bruce K. Winker, Ventura; Jane H. Hanamoto, Thousand Oaks, both of Calif.

[73] Assignee: Rockwell Science Center, LLC, Thousand Oaks, Calif.

[21] Appl. No.: 09/162,342

[22] Filed: Sep. 28, 1998

[51] Int. Cl.⁶ .................................................. G02F 1/1335
[52] U.S. Cl. ............................................ 349/118; 349/123
[58] Field of Search ..................................... 349/118, 123, 349/124, 127, 131, 136

[56] References Cited

U.S. PATENT DOCUMENTS

| | | |
|---|---|---|
| 5,155,610 | 10/1992 | Hikmet et al. ........................ 349/123 |
| 5,196,953 | 3/1993 | Yeh et al. . |
| 5,504,603 | 4/1996 | Winker et al. . |
| 5,557,434 | 9/1996 | Winker et al. . |
| 5,589,963 | 12/1996 | Gunning, III et al. . |
| 5,612,801 | 3/1997 | Winker . |
| 5,619,352 | 4/1997 | Koch et al. . |
| 5,638,197 | 6/1997 | Gunning, III et al. . |
| 5,667,854 | 9/1997 | Yamada .................................. 349/118 |

*Primary Examiner*—William L. Sikes
*Assistant Examiner*—James Dudek
*Attorney, Agent, or Firm*—Craig E. Shinners

[57] ABSTRACT

The present invention relates to thin film retardation plates, such as cholesteric and A-plate compensators, for improving the viewing angle and contrast of liquid crystal displays. The A-plate is fabricated using a single substrate onto which a layer of polymerizable reactive mesogens (RMs) is solvent cast. Included in the RMs solution is an additive that migrates to the RM/air interface to lower the surface energy and generate an additive-rich surface layer, which in turn lowers the intrinsic tilt angle of the RMs at the air interface to between 25 degrees (25°) and about zero degrees (0°). The solvent is evaporated and the resulting film is polymerized in the liquid crystal phase to permanently orient the liquid crystal. The resulting film may be readily separated from the substrate and shaped into any desired pattern and combined to form novel compensators. In an alternative embodiment, a tilt may be provided by treating the substrate with an oblique alignment layer to form a compensator having a defined splay through the bulk of the thin film.

61 Claims, 2 Drawing Sheets

THIN FILM COMPENSATORS HAVING PLANAR ALIGNMENT OF POLYMERIZED LIQUID CRYSTALS AT THE AIR INTERFACE

BACKGROUND OF THE INVENTION (1) Field of the Invention

The present invention relates to optical retardation means and more particularly to thin film retarders for improving the viewing angle and brightness of liquid crystal displays.

(2) Description of Related Art

Tremendous advances in liquid crystal display technology has created advanced display devices that are brighter, lighter, and capable of displaying information with high resolution. Due to the lightweight, smaller form factor and low power requirements of liquid crystal displays, they offer several advantages over alternative displays such as cathode ray tube displays. However, liquid crystal displays suffer from poor contrast and/or chromaticity at wide viewing angles such that viewing the display is often difficult in many viewing environments.

The primary factor limiting the contrast ratio achievable in a liquid crystal display arises from light that leaks through portions of the display that are supposed to be in the dark state. The contrast ratio of a liquid crystal also depends on the viewing angle of the observer. As is well known, the contrast ratio in a typical liquid crystal display is a maximum only within a narrow viewing angle centered about the normal incidence and drops off as the viewing angle increases. This viewing angle related decrease in the contrast ratio is caused by light leaking through dark state pixel elements at large viewing angles. Large viewing angles may also cause color shifts in color displays.

To improve both the contrast and viewing angle, optical compensator layers may be included in the liquid crystal display. The need for such compensators increases for supertwisted nematic (STN) liquid crystal displays where it is common practice to include a second STN display panel having an opposite twist to compensate for the birefringence of the first panel. Since it is expensive to provide a second liquid crystal display panel solely as a compensator, many displays include optical compensators such as phase retardation films. The use of such retardation films have been disclosed in U.S. Pat. Nos. 5,196,953 (issued to Yeh et al.), 5,504,603 (issued to Winker et al.), 5,557,434 (issued to Winker et al.), 5,589,963 (issued to Gunning, III et al.), 5,619,352 (issued to Koch et al.), 5,612,801 (issued to Winker) and 5,638,197 (issued to Gunning, III et al.). A liquid crystal layer is sandwiched between a pair of polarizer layers with one polarizer having an absorbing layer perpendicular to the absorbing axis of the other. With the addition of one or more compensator layers, the contrast ratio is improved over a wide range of viewing angles by careful orientation of the optic axis of the compensator. The combined retardation effect of the compensator cancels the phase retardation inherent in liquid crystal displays. All of the above referenced patents are either commonly assigned with this application or assigned to the assignee's parent corporation, Rockwell International Corporation.

One type of compensator included in the compensator layers discussed in these patents is known as A-plate compensator. An A-plate is a birefringent layer with its extraordinary axis (i.e. its c-axis) oriented parallel to the surface of the layer and its a-axis oriented normal to the surface (parallel to the direction of normally incident light). Prior art A-plates may be fabricated by the use of uniaxially stretched polymer films, such as polyvinyl alcohol or other suitable oriented organic birefringent material.

Unfortunately, the quality and uniformity of the optical properties of such prior art A-plates are generally poor. Further, the A-plate must be held under tension and the material must be relatively thick to obtain sufficient anisotropy. Further still, lamination of such A-plates with other retardation films often results in stress-induced birefringence when exposed to elevated temperatures.

Recently, it has been reported that retardation films may be obtained from ultraviolet (UV) curable liquid crystals. See, for example, H. Hasebe, K. Takeuchi and H. Takatsu, J.SID, 3/3, 139 (1995). As shown in FIG. 5, two substrates are provided so that traditional alignment techniques may be used to eliminate any splay in the crystal structure that may otherwise be introduced by the intrinsic tilt of the liquid crystal at the liquid crystal/air interface. However, since polyimide alignment material is very expensive, it is undesirable to apply alignment layers to two substrates. It is also undesirable to incur the expense associated with aligning and spacing the two substrates if one or both of the substrates are to be discarded after photopolymerization of the UV-curable liquid crystal. It is further still undesirable to rely on spaced parallel substrates to establish the orientation of the liquid crystal prior to photopolymerization since there is a practical limitation on the size and uniformity achievable with spaced substrates.

Clearly, it is desirable to minimize the number of substrates required to orient the UV-curable liquid crystal material. As noted in the above-referenced U.S. Pat. No. 5,619,352, polymerizable liquid crystals may be used in a process that coats a single substrate surface to create thin film compensators. This process eliminates the need to provide a second substrate having an alignment layer for aligning the liquid crystal. However, most polymerizable liquid crystals have an intrinsic non-zero tilt angle at the polymerizable liquid crystal/air interface that makes it difficult to achieve the planar orientation of the liquid crystal needed for A-plate compensators. Accordingly, an efficient and economical method is needed for achieving a tilt angle at the nematic/air interface necessary that is lower than the intrinsic tilt angle of the polymerizable liquid crystal.

SUMMARY OF THE INVENTION

The present invention relates to thin film compensators for improving the viewing angle and contrast of liquid crystal displays and more particularly, twisted nematic liquid crystal displays. Thin film compensators, such as cholesteric and A-plate compensators, can be fabricated using a single substrate onto which a layer of polymerized liquid crystals is applied. Advantageously, the polymerizable liquid crystal has a uniform tilt angle of about 0° at the polymerizable liquid crystal/air interface. Alternatively, the polymerizable liquid crystal has a tilt angle at the nematic/air interface that is greater than zero degrees but lower than the intrinsic tilt angle of the polymerizable liquid crystal.

The present invention applies a solution of polymerizable liquid crystals to a prepared substrate. The solution includes polymerizable liquid crystals combined with a class of additives that will properly orient the polymerizable liquid crystals at the polymerizable liquid crystal/air interface. The additives may be surfactants, release agents, or other surface-active chemicals that are soluble in the solution. The concentration of the additives in the solution should exceed a minimum critical value but should not exceed an excess value at which phase separation occurs. The additives can be either reactive or non-reactive. For example both reactive (such as acrylates and vinyl ethers) and non-reactive silicon oil surfactants may be advantageously used.

The solution is then deposited onto a substrate having an anisotropic surface. The additives migrate to the polymerizable liquid crystal/air interface and generate an additive-rich surface layer, which in turn lowers the intrinsic tilt angle of the polymerizable liquid crystals at the air interface. The resulting film is polymerized in the liquid crystal phase to permanently fix the appropriate molecular orientation.

The resulting film may be readily separated from the substrate and shaped into any desired pattern. These and other advantages of the present invention not specifically described above will become clear within the detailed discussion herein.

DETAILED DESCRIPTION OF THE INVENTION

According to the principles of the present invention, a new thin film compensator for improving the viewing angle and brightness of liquid crystal displays is provided. Specifically, in the method of the present invention, polymerizable liquid crystal material is deposited onto a single substrate to obtain a thin film birefringent compensator. Since a compensator corrects for phase retardation introduced by the liquid crystal display by retarding the phase of transmitted light, it is common to refer to the compensator as a phase retardation plate. These compensator films comprise a birefringent layer, having a tilt angle at the polymerizable liquid crystal/air interface that is less than about 25 degrees. Preferably, the layer has a substantially zero tilt angle at the polymerizable liquid crystal /air interface, with its extraordinary axis (i.e. the c-axis) oriented parallel to the surface of the layer and the a-axis oriented normal to the surface (i.e. parallel to the direction of normally incident light). In the case when the polymerizable liquid crystal material is chiral, the c-axis varies azimuthally throughout the film, and the film is referred to as cholesteric film. In the case when the polymerizable liquid crystal material is achiral, the c-axis orients uniformly in a specific azimuthal direction in the bulk of the film, and the resulting film is an A-plate film.

Copending patent application Ser. No. 08/313,531 entitled Organic Polymer O-Plate Compensator For Improved Gray Scale Performance in Twisted Nematic Liquid Crystal Displays the discloses an O-plate compensator film that has a high tilt orientation of the director of the liquid crystal material at the air interface. In particular, this application, the disclosure of which is incorporated herein by reference, illustrates the fabrication and use of an O-plate compensator with polarizers and/or analyzers in a liquid crystal display (LCD) system so as to improve the contrast ratio. The above-referenced co-pending application is assigned to the assignee of the present application.

Figure 1:
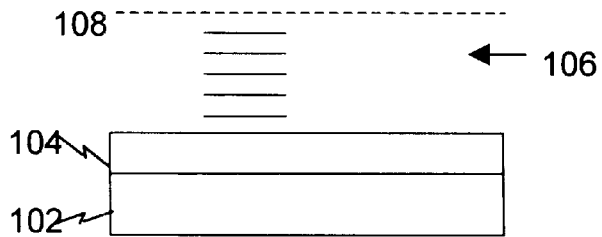
FIG. 1 illustrates a sectioned view of an A-plate compensator in accordance with the present invention.

In FIG. 1 an illustrative embodiment of the invention is described below as it might be implemented using a polymeric liquid crystalline thin film to create an A-plate compensator. Specifically, FIG. 1 illustrates a substrate 102 having an alignment layer 104 applied to one surface. A thin film 106 of polymerizable liquid crystals is applied on top of alignment layer 104.

Figure 2:
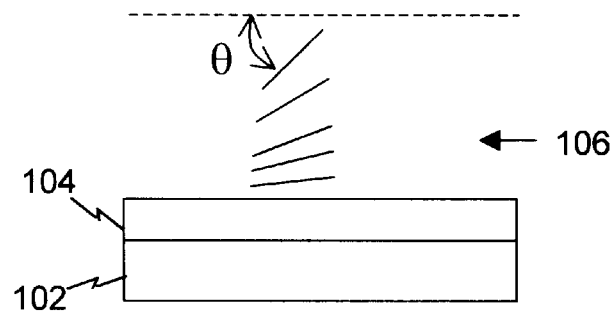
FIG. 2 is a sectioned view of a polymerizable liquid crystal material deposited on a single substrate illustrating the inherent tilt of the polymerizable liquid crystals at the air interface.

Coating one surface of substrate 102 with a polyimide material produces alignment layer 104. The alignment layer is then treated so that the molecules of polymerizable liquid crystal will have a low tilt angle at the interface of the polymerizable liquid crystal and alignment layer 104. Since the present invention provides a single substrate, the top of the thin film 106 forms an interface with the air, as indicated at 108. As discussed above, the molecules of the polymerizable liquid crystal have an intrinsic tilt (i.e., approximately 20° to 80°) at the polymerizable liquid crystal/air interface 108 that must be overcome to obtain an A-plate. This intrinsic tilt angle θ is shown in FIG. 2 and the molecules will tend to exhibit an undesirable degree of splay through the thickness of thin film 106.

With the present invention, however, a substantially zero degree (0°) tilt angle at the polymerizable liquid crystal/air interface 108 is achieved in one preferred embodiment such as shown in FIG. 1. As explained more fully below, thin film 106 possesses a free surface at the polymerizable liquid crystal/air interface 108 that includes an additive-rich concentration or layer near the air interface. The concentration of the additive lowers the tilt angle of the polymerizable liquid crystals at the air interface. Thus, by modifying the concentration of the additive-rich layer, the liquid cyrstal material may have a tilt angle greater than or equal to about zero degrees but less than the intrinsic tilt angle of the liquid crystal material at the polymerizable liquid crystal/air interface 108. More particularly, by varying the concentration of the additive, the tilt angle at the air interface may be between zero degrees (0°) and about 25 degrees (25°).

The polymerizable liquid crystal layer is polymerized in the liquid crystal phase to permanently fix the molecular order with a substantially parallel orientation of the director of the liquid crystal at the free surface. Or, by varying the amount of surfactant, the polymerizable liquid crystal layer is polymerized at an angle that is between about zero degrees and the intrinsic tilt angles at the air interface.

At the substrate/liquid crystal interface, the director of the liquid crystal proximate to the liquid crystal alignment layer may be oriented substantially parallel to the substrate, as shown in FIG. 1, or at a selected oblique angle relative to the substrate. One skilled in the art will appreciate that known means for depositing and treating an alignment layer may be used to orient the director of the liquid crystal proximate to the substrate at another selected angle as may be required by engineering or design considerations.

With an oblique orientation of the liquid crystal director, it is possible to establish a uniform tilt variation through thin film layer 106 since the tilt angle at the polymerizable liquid crystal/air interface 108 will remain substantially parallel to substrate 102 with the present invention. Variation in the azimuthal angle through the thin film layer may be achieved by doping the polymerizable liquid crystal solution with a chiral additive in sufficient quantity to provide a desired helical pitch along an axis normal to thin film 106.

The present invention uses a liquid crystal material chosen from the group consisting of acrylates, vinyl ethers and epoxides. One preferred source of the polymerizable liquid crystal (RM82) may be obtained from Merck Ltd., of Dorset, U.K. This polymerizable liquid crystal includes difunctional reactive material, ester linkages, and aromatic groups.

A polymerizable liquid crystal solution can be formulated to facilitate the deposition process. Such a solution is a mixture of several components. First of all, it includes the polymerizable liquid crystals. The polymerizable liquid crystal solution may also include an organic solvent or a mixture of organic solvents to aid in the deposition of the solution onto a substrate.

An additive is preferably included with the polymerizable liquid crystal solution to reduce the intrinsic tilt angle of the liquid crystal director at the polymerizable liquid crystal/air interface 108. Specifically, the additive is a surfactant, release agent, or other surface-active chemical that is soluble in the polymerizable liquid crystal solution. The additive can be either reactive or non-reactive. It has been found that both reactive (such as acrylates and vinyl ethers) and non-reactive silicon oil surfactants may be advantageously used. By way of example, the surface-active material may be selected from the group consisting of polyacrylate polymers, polysilicone polymers, reactive polysilicone polymers, organosilanes, waxes, and mold releases. More particularly, the surface-active material is selected from the group consisting of polycyclohexylmethacrylate (PCHM) (a current preferred surface-active material), Monsanto modaflow 2100 available form Monsanto Chemical Company of St. Louis Mo., polydimethylsiloxane (PDMS), dimethyl diethoxysilane and polymethylmethacrylate (PMMA).

The concentration of the additive in the polymerizable liquid crystal solution should exceed a minimum critical value sufficient to minimize the intrinsic tilt but the concentration should not exceed an excess value at which phase separation occurs. It has been found that the surface-active material should constitute between 0.1% and 10.0% and more particularly less than about 5.0% by weight of the liquid crystal material. The optimum concentration of surface active material is determined empirically and, is influenced by many factors. For example, the optimum concentration may be influenced by the surface tension of the additive and the polymerizable liquid crystal, the thickness of the resulting polymerized film, and the temperature at which the liquid crystal is polymerized. It will be appreciated by those of familiar with the art that additional factors may arise for specific engineering applications that may affect the optimum concentration.

In one preferred embodiment, about 0.2% by weight of surfactant reduces the intrinsic tilt of the polymerizable liquid crystal at the air interface to about zero degrees in a film with a thickness of about 1.0 μm. As a further example, the concentration of PMMA is varied in RM257 liquid crystal material in accordance with the following tabulated results:

TABLE 1

| Concentration (wt. %) | Thickness (μm) | Tilt Angle (θ) |
|---|---|---|
| 0.1 | 0.347 | 44.8 |
| 0.5 | 0.337 | 38.5 |
| 0.5 | 0.368 | 31.9 |
| 1.0 | 0.318 | 9.8 |
| 5.0 | 0.371 | 2.0 |

For illustration purposes, another preferred formulation for generation of an A-plate compensator has a thin film thickness of about 1.0 μm applied to the substrate by a meniscus coating technique. The formulation comprises the following: 1) 14% by weight polymerizable liquid crystal (RM257); 2) 0.14 wt. % photoinitiator (Irgacure 651, available from Ceiba Geigy); 3) 0.024 wt. % surfactant (PCHM); and 4) 85.836 wt. % solvent (cyclopentanone). Another preferred formulation for generating a thin film thickness of about 80 μm comprises the following: 1) 35% by weight RM257 and 15% wt. % RM82 (also available from Merck Ltd.); 2) 0.5 wt. % photoinitiator (Irgacure 651); 3) 0.012 wt. % surfactant (PDMS); and 4) 49.5 wt. % organic solvent (monochlorobenzene).

It should be apparent that the thickness of the thin film, as well as the alignment angle at the substrate/polymerizable liquid crystal interface, may be readily varied to achieve desired optical properties. The actual thickness of the thin film will, of course, depend on several factors such as the relative concentration of the solution, the rate at which the material is applied to substrate 102 by the coating process, the viscosity of the formulation, and the surface tension of the solution.

The polymerizable liquid crystal thin films can be deposited onto a prepared substrate by many coating techniques known in the industry. By way of example, the coating method can be one of the following: spin coating, meniscus coating, and slot die coating, etc.

Figure 4:
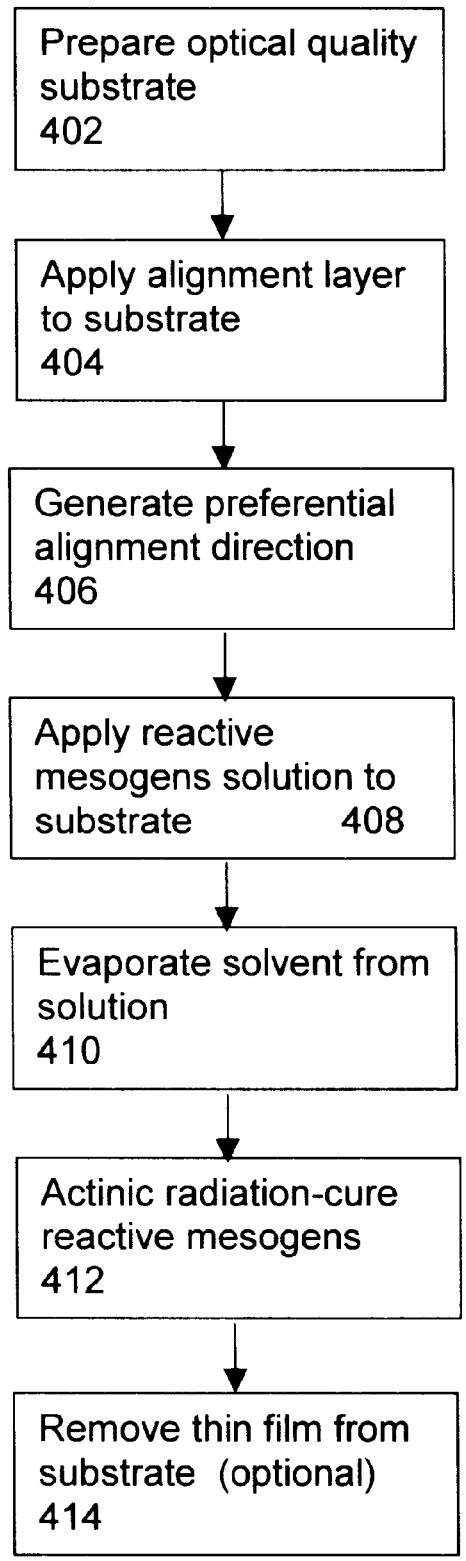
FIG. 4 illustrates a process flow diagram for manufacture of a retardation thin film in accordance with the present invention.

Referring now to FIG. 4 with reference to FIG. 1, a flow diagram for implementing a process 400 according to the method of the present invention for preparing an optical retardation plate having a substantially zero tilt angle at the polymerizable liquid crystal/air interface 108. Process 400 is particularly adapted to provide A-plate compensators. However, it should be apparent to one skilled in the art that novel variations are readily possible by selecting liquid crystal material having specific properties that achieve specific application goals, by varying the concentration of the chiral dopant to provide a cholesteric pitch and twist angle, and by varying the alignment angle in which the director of the liquid crystal material is oriented relative to substrate 102.

Process 400 begins with selection of an appropriate substrate 102. In step 402, substrate 102 is inspected for optical defects. Substrate 102 is cleaned to remove any contaminants and prepared for the deposition of the alignment layer. It is to be understood that process 400 is performed in a cleanroom environment.

In step 406, alignment layer 104 is applied to a surface of substrate 102. Alignment layer 104 is a thin coating of polymer or other materials that establishes the preferred orientation of molecular direction in liquid crystalline mesophase. To establish the orientation, the exposed surface of the alignment layer is buffed or stroked in a single direction with a soft material to create an anisotropic surface property that aligns the liquid crystal molecules in a common azimuthal direction parallel to the surface of the substrate. Examples of the preferred coatings that may be used for establishing the alignment layer are polyvinyl alcohol, silanes and polyimides.

For oblique alignment angles, silicon oxide may be deposited obliquely onto the surface of the substrate 102 using physical vapor deposition. If it is desired to obtain an homeotropic alignment (i.e., where the liquid crystal molecules are aligned perpendicular to substrate 102) alignment layer 104 may consist of an amphiphilic material coating in which each molecule of the alignment layer 104 has a polar end and a non-polar end. The polar ends adhere to the substrate while the non-polar end (usually a hydrocarbon chain) points into the liquid crystal space. Other methods of achieving planar and homeotropic alignment that are known in the art, such as photoalignment, may also be employed.

Figure 3:
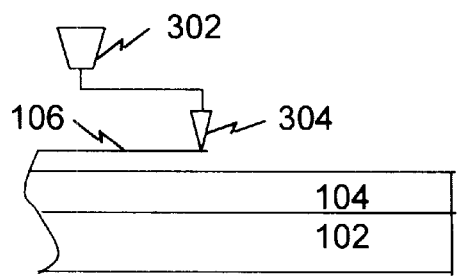
FIG. 3 illustrates one possible manner for depositing the polymerizable liquid crystal material onto a substrate.
Figure 5:
FIG. 5 illustrates a phase diagram for polymerizable liquid crystal material.

After completion of the alignment layer process, the polymerizable liquid crystal solution is solvent cast onto substrate 102 as indicated at step 408. As shown in FIG. 3, the solution is preferably applied using a meniscus coating technique where the polymerizable liquid crystal solution is pumped from a reservoir 302 through a slotted head 304 that traverses across the substrate at a selected rate. By varying the distance of head 304 from substrate 102 and controlling the rate at which head 304 travels, varying thickness of thin film 106 may be obtained In step 410, the solvent is evaporated to allow the liquid crystal mesophase to form and align in the preferred direction. Solvent evaporation may be accomplished by (using the above described formulations) placing the coated substrate on a hot plate at a set temperature of about 90° C. for between one to five minutes. It will be appreciated that the temperature profile of the film during this process depends on several factors. For example, the temperature profile will depend on the thermal coefficients of the substrate and, as shown in FIG. 4, the temperatures, $T_1$ and $T_2$, at which the polymerizable liquid crystal material transitions to the nematic phase from the crystal phase or other highly ordered liquid crystal phases and to the isotropic phase from the nematic phase. It is desirable to maintain the temperature of the film between temperatures $T_1$ and $T_2$.

After the solvent is evaporated, the film is polymerized in the liquid crystal phase to permanently align thin film 106 in the appropriate molecular order in step 412. Polymerization in one preferred embodiment is accomplished by illumination of thin film 106 with actinic radiation. For the specific formulations discussed above, exposure to ultraviolet light (with the temperature of the film maintained between temperatures $T_1$ and $T_2$) will establish permanent cross linkage between adjacent liquid crystals to form long chains of cross-linked molecules. When these cross linkages are formed, the liquid crystal material establishes a plastic film having a fixed alignment in the preferred orientation.

After thin film 106 is polymerized, step 414, the thin film may be removed from the substrate and the substrate may be discarded or reused. Alternatively, the thin film may be retained on substrate 102 for specific applications. The thin film may be readily combined with other retardation films to provide novel compensator structures, such as disclosed in the above-reference patent applications the disclosure of which are hereby incorporated by reference.

A significant advantage of the present invention arises from the fact that the small liquid crystal molecules prior to polymerization are easily aligned in the preferred orientation. Further, since the material is initially in a liquid or viscous form, the present invention affords great flexibility in selecting and preparing the shape or thickness of the film, as well as in forming patterned or pixelated retardation films (in which the retardation or the optical axis of the film changes from position to position) by way of using a photo alignment layer, or using photomasks during the UV radiation.

In the discussion above, substrate 102 is preferably a sheet of soda-lime glass having sufficient rigidity to support the film during the manufacturing process. Such substrates are relatively inexpensive and may be obtained in a variety of sizes. Advantageously, the present invention is also compatible with the use of plastic substrates. Indeed with plastic substrates, it may be possible to eliminate the polyimide alignment layer by directly buffing the plastic substrate to obtain the anisotropic effect with the liquid crystalline material.

Using the meniscus coating process described above, it has been possible to obtain A-plates having a surface area of about 289 square inches (17 inches by 17 inches) using commercially available meniscus coater equipment. It should be apparent that by moving the substrate under the coater head 304, a continuous strip may be readily obtained. Alternatively, other coating methods known in the art may be employed to achieve similar results.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. A method of making a phase retardation plate, comprising the steps of:

providing a substrate;

applying a liquid crystal alignment layer to the substrate;

applying a thin film of a polymerizable liquid crystal material to the alignment layer such that the free surface of the thin film constitutes a liquid crystal/air interface, the liquid crystal material including a surface active material that reduces the intrinsic tilt orientation of the director of the liquid crystal material at the liquid crystal/air interface;

adjusting the temperature of the thin film to orient the director of the thin film in the bulk of the thin film; and polymerizing the thin film to preserve the orientation.

2. The method of claim 1, wherein said step of applying a liquid crystal alignment mechanism to the substrate comprises:

applying a liquid crystal alignment layer to the substrate and wherein said step of applying a thin film of a polymerizable liquid crystal material comprises:

applying a thin film of a polymerizable liquid crystal material to the alignment layer such that the free surface of the thin film constitutes a liquid crystal/air interface, the liquid crystal material including a surface-active material that reduces the intrinsic tilt orientation of the director of the liquid crystal material at the liquid crystal/air interface.

3. The method of claim 1, wherein said step of providing a substrate comprises:

providing a plastic substrate;

wherein said step of applying a liquid crystal alignment mechanism to the substrate comprises:

rubbing the substrate to provide an alignment mechanism thereon for liquid crystal molecules;

and wherein said step of applying a thin film of a polymerizable liquid crystal material comprises:

applying a thin film of a polymerizable liquid crystal material to the aligned substrate such that a free surface of the thin film constitutes a liquid crystal/air interface, the liquid crystal material including a surface-active material that reduces the intrinsic tilt orientation of the director of the liquid crystal material at the liquid crystal/air interface.

4. The method of claim 1, wherein said step of applying a thin film of a polymerizable liquid crystal material comprises applying a thin film such that the alignment of the liquid crystal material at the interface with the liquid crystal alignment layer is substantially parallel.

5. The method of claim 1, wherein said step of applying a thin film of a polymerizable liquid crystal material comprises applying a thin film such that the alignment of the liquid crystal material at the interface with the liquid crystal alignment layer is substantially oblique.

6. The method of claim 1, wherein said step of polymerizing the thin film further comprises illuminating the thin film with actinic radiation to polymerize the thin film.

7. The method of claim 1, wherein the liquid crystal material is chosen from the group consisting of acrylates, vinyl ethers and epoxides.

8. The method of claim 1, wherein the liquid crystal material includes difunctional reactive material.

9. The method of claim 1, wherein the liquid crystal material includes ester linkages.

10. The method of claim 1, wherein the liquid crystal material includes aromatic groups.

11. The method of claim 1, wherein the surface-active material constitutes less than 5% by weight of the liquid crystal material.

12. The method of claim 1, wherein the surface-active material is selected from the group consisting of polyacrylate polymers, polysilicone polymers, reactive polysilicone polymers, organosilanes, waxes, and mold releases.

13. The method of claim 12, wherein the surface-active material is selected from the group consisting of polycyclohexylmethacrylate, copolymers of polycyclohexylmethacrylate, Monsanto modaflow 2100, polydimethylsiloxane, polymethylmethacrylate, and dimethyl diethoxysilane.

14. The method of claim 1, wherein said liquid crystal material including a surface-active material that produces a substantially parallel orientation of the director of the director of the liquid crystal material at the liquid crystal/air interface.

15. The method of claim 1, wherein said liquid crystal material includes a surface-active material that produces an orientation of the director of the director of the liquid crystal material at the liquid crystal/air interface of about 25 degrees (25°).

16. The method of claim 1, wherein said liquid crystal material includes a surface-active material that produces an orientation of the director of the director of the liquid crystal material at the liquid crystal/air interface of between about zero degrees (0°) and about 25 degrees (25°).

17. The method of claim 12, wherein said liquid crystal material includes a surface-active material that produces an orientation of the director of the director of the liquid crystal material at the liquid crystal/air interface of between about zero degrees (0°) and about 25 degrees (25°).

18. The method of claim 3, wherein said liquid crystal material includes a surface-active material that produces an orientation of the director of the director of the liquid crystal material at the liquid crystal/air interface of between about zero degrees (0°) and about 25 degrees (25°).

19. The method of claim 3, wherein said liquid crystal material including a surface-active material that produces a substantially parallel orientation of the director of the director of the liquid crystal material at the liquid crystal/air interface.

20. A phase retardation plate, comprising:
a thin film of a polymerized liquid crystal material; and
a surface-active material disposed in said thin film near a first surface of said thin film such that said surface-active material reduces the intrinsic tilt orientation of the director of the liquid crystal material near the first surface.

21. The phase retardation plate of claim 20, wherein the liquid crystal material is chosen from the group consisting of acrylates, vinyl ethers and epoxides.

22. The phase retardation plate of claim 20, wherein the liquid crystal material includes a difunctional reactive material.

23. The phase retardation plate of claim 20, wherein the liquid crystal material includes ester linkages.

24. The phase retardation plate of claim 20, wherein the liquid crystal material includes aromatic groups.

25. The phase retardation plate of claim 20, wherein the concentration of said surface-active material exceeds a minimum value sufficient to minimize intrinsic tilt of said liquid crystal material near said first surface and no more than a maximum value that causes phase separation of said liquid crystal material.

26. The phase retardation plate of claim 20, wherein said surface-active material constitutes less than 5% by weight of the liquid crystal material.

27. The phase retardation plate of claim 20, wherein the liquid crystal material is selected from the group consisting of polyacrylate polymers, polysilicone polymers, reactive polysilicone polymers, organosilanes, waxes, and mold releases.

28. The phase retardation plate of claim 20, wherein said surface-active material is selected from the group consisting of polycyclohexylmethacrylate, copolymers of polycyclohexylmethacrylate, Monsanto modaflow 2100, polydimethylsiloxane, polymethylmethacrylate, and dimethyl diethoxysilane.

29. The phase retardation plate of claim 20, wherein the concentration of said surface-active material produces a substantially parallel orientation of the director of the liquid crystal material near the first surface, said film having the director uniformly orientated in a specific azimuthal direction in the bulk of said thin film.

30. The phase retardation plate of claim 20, wherein the concentration of said surface-active material produces a tilt orientation of the director of the liquid crystal material near the first surface of between about 0 degrees (0°) and about 25 degrees (25°).

31. A phase retardation plate, comprising:
a substrate;
a liquid crystal alignment layer disposed on said substrate;
a thin film of a polymerized liquid crystal material disposed on said alignment layer, such that the exposed surface of said thin film constitutes a liquid crystal/air interface; and
a surface-active material disposed in said thin film near the liquid crystal/air interface, such that said surface active-material produces a substantially parallel orientation of the director of the liquid crystal material at the liquid crystal/air interface,
said thin film having the director uniformly oriented in a specific azimuthal direction in the bulk of said thin film.

32. The phase retardation plate of claim 31, wherein the alignment of the liquid crystal material near said liquid crystal alignment layer is substantially parallel.

33. The phase retardation plate of claim 31, wherein the alignment of the liquid crystal material near said liquid crystal alignment layers is substantially oblique.

34. The phase retardation plate of claim 31, wherein the liquid crystal material is chosen from the group consisting of acrylates, vinyl ethers and epoxides.

35. The phase retardation plate of claim 31, wherein the liquid crystal material includes a difunctional reactive material.

36. The phase retardation plate of claim 31, wherein the liquid crystal material includes ester linkages.

37. The phase retardation plate of claim 31, wherein the liquid crystal material includes aromatic groups.

38. The phase retardation plate of claim 31, wherein the surface-active material constitutes less than 5% by weight of the liquid crystal material.

39. The phase retardation plate of claim 31, wherein the surface-active material is selected from the group consisting of polyacrylate polymers, polysilicone polymers, reactive polysilicone polymers, organosilanes, waxes, and mold releases.

40. The phase retardation plate of claim 31, wherein said surface-active material is selected from the group consisting of polycyclohexylmethacrylate, copolymers of polycyclohexylmethacrylate, Monsanto modaflow 2100, polydimethylsiloxane, polymethylmethacrylate, and dimethyl diethoxysilane.

41. A method of making a phase retardation plate, comprising the steps of:
providing a plastic substrate; applying a thin film of a polymerizable liquid crystal material to said substrate such that the exposed surface of the thin film constitutes a liquid crystal/air interface, the liquid crystal material including a surface-active material that reduces the intrinsic tilt orientation of the director of the liquid crystal material at the liquid crystal/air interface;
adjusting the temperature of the thin film to orient the director of the thin film in the bulk of the thin film; and
polymerizing the thin film to preserve the orientation.

42. The method of claim 41, further comprising the step of:
buffing a surface of said plastic substrate to obtain the alignment mechanism for the liquid crystalline material upon application of the thin film.

43. The method of claim 41, wherein the step of applying the thin film comprises applying a thin film such that the alignment of the liquid crystal material at the interface with the substrate is substantially parallel.

44. The method of claim 41, wherein said step of polymerizing the thin film further comprises illuminating the thin film with actinic radiation to polymerize the thin film.

45. The method of claim 41, wherein the liquid crystal material is chosen from the group consisting of acrylates, vinyl ethers and epoxides.

46. The method of claim 41, wherein the liquid crystal material includes difunctional reactive material.

47. The method of claim 41, wherein the liquid crystal material includes ester linkages.

48. The method of claim 41, wherein the liquid crystal material includes aromatic groups.

49. The method of claim 41, wherein the surface-active material constitutes less than 5% by weight of the liquid crystal material.

50. The method of claim 41, wherein the surface-active material is selected from the group consisting of polyacrylate polymers, polysilicone polymers, reactive polysilicone polymers, organosilanes, waxes, and mold releases.

51. The method of claim 41, wherein the surface-active material is selected from the group consisting of polycyclohexylmethacrylate, copolymers of polycyclohexylmethacrylate, Monsanto modaflow 2100, polydimethylsiloxane, polymethylmethacrylate, and dimethyl diethoxysilane.

52. The method of claim 41, wherein the concentration of the surface-active material is sufficient to produce a substantially parallel orientation of the director of the liquid crystal material at the liquid crystal/air interface.

53. The method of claim 41, wherein the concentration of the surface-active material is sufficient to produce a tilt orientation of the director of the liquid crystal material at the liquid crystal/air interface of between about zero degrees (0°) and about 25 degrees (25°).

54. A phase retardation plate, comprising
a substrate;
a thin film of a polymerized liquid crystal material disposed on said substrate such that said thin film has an exposed first surface, said thin film having an orientation of the director of the liquid crystal material at said first surface that is less than the intrinsic tilt orientation of the director and an azimuthal orientation rotation of said director in the bulk of said thin film.

55. The phase retardation plate of claim 54 wherein said thin film of polymerized liquid crystal further comprises a second surface adjacent to said substrate, said second surface having an orientation of the director of the liquid crystal material substantially parallel to the director of the liquid crystal material at the first surface.

56. The phase retardation plate of claim 54 wherein said thin film of polymerized liquid crystal further comprises a second surface having an orientation of the director of the liquid crystal material substantially oblique to the director of the liquid crystal material at the first surface.

57. The phase retardation plate of claim 54 wherein said thin film of polymerized liquid crystal has a tilt orientation of the director of the liquid crystal material at the liquid crystal/air interface of between about zero degrees (0°) and about 25 degrees (25°).

58. The phase retardation plate of claim 54 wherein the azimuthal orientation rotation of said director in the bulk of said thin film of liquid crystal material is generated by the addition of a chiral dopant and the reduction in the tilt orientation of the director of the liquid crystal material at the liquid crystal/air interface, relative to the intrinsic tilt angle, is generated by a surface active additive.

59. The phase retardation plate of claim 58 wherein the azimuthal orientation rotation of the director in the bulk of said thin film is generated by the addition of a reactive chiral dopant.

60. The phase retardation plate of claim 58 wherein the azimuthal orientation rotation of the director in the bulk of said thin film is generated by the addition of a non-reactive chiral dopant.

61. The phase retardation plate of claim 58 wherein the surface-active material is selected from the group consisting of polycyclohexylmethacrylate, copolymers of polycyclohexylmethacrylate, Monsanto modaflow 2100, polydimethylsiloxane, polymethylmethacrylate, and dimethyl diethoxysilane.

* * * * *

UNITED STATES PATENT AND TRADEMARK OFFICE
CERTIFICATE OF CORRECTION

PATENT NO : 5,995,184
DATED : November 30, 1999
INVENTOR(S) : Young J. Chung, et al.

It is certified that error appears in the above-identified patent and that said Letters Patent is hereby corrected as shown below:

Col. 9, line 40 please delete "of the director" (first occurrence).

Col. 9, line 45 please delete "of the director " (first occurrence).

Col. 9, line 50 please delete "of the director" (first occurrence).

Col. 9, line 55 please delete "of the director " (first occurrence).

Col. 9, line 60 please delete "of the director" (first occurrence).

Col. 9, line 65 please delete "of the director " (first occurrence).

Signed and Sealed this

Twelfth Day of September, 2000

*Attest:*

Q. TODD DICKINSON

*Attesting Officer*     *Director of Patents and Trademarks*